United States Patent [19]

Bird

[11] Patent Number: 5,428,353

[45] Date of Patent: Jun. 27, 1995

[54] ROAD USE CHARGING APPARATUS

[76] Inventor: Richard F. Bird, The Studios, 9 Rylett Road, London W12 9NL, United Kingdom

[21] Appl. No.: 39,326

[22] PCT Filed: Oct. 24, 1991

[86] PCT No.: PCT/GB91/01863

§ 371 Date: Apr. 22, 1993

§ 102(e) Date: Apr. 22, 1993

[87] PCT Pub. No.: WO92/08210

PCT Pub. Date: May 14, 1992

[30] Foreign Application Priority Data

Oct. 24, 1990 [GB] United Kingdom ............... 9023093
Jul. 5, 1991 [GB] United Kingdom ............... 9114597

[51] Int. Cl.$^6$ .......................................... G08G 1/01
[52] U.S. Cl. .................................. 340/933; 340/928; 340/937; 340/941; 235/384; 235/381; 364/401
[58] Field of Search ............ 340/933, 928, 937, 941, 340/932.3, 505, 539, 825.54; 235/384, 381; 364/401, 406, 408

[56] References Cited

U.S. PATENT DOCUMENTS

| | | | |
|---|---|---|---|
| 3,602,881 | 8/1971 | Bayne | 340/928 |
| 4,303,904 | 12/1981 | Chasek | 340/23 |
| 4,338,587 | 7/1982 | Choappetti | 340/539 |
| 4,860,341 | 8/1989 | D'Arello et al. | 379/91 |
| 4,963,723 | 10/1990 | Masada | 364/467 |
| 4,977,501 | 12/1990 | Lefevre | 364/401 |
| 5,086,389 | 2/1992 | Hassett et al. | 340/928 |
| 5,101,200 | 3/1992 | Swett | 340/937 |
| 5,144,553 | 9/1992 | Hassett et al. | 340/928 |
| 5,204,675 | 4/1993 | Sekine | 340/928 |
| 5,253,162 | 10/1993 | Hassett et al. | 340/928 |

FOREIGN PATENT DOCUMENTS

| | | |
|---|---|---|
| 0402821 | 6/1989 | European Pat. Off. . |
| 0034570 | 2/1981 | France . |
| 2503423 | 3/1981 | France . |
| 2594985 | 11/1985 | France . |
| 2636153 | 9/1988 | France . |
| 0323326 | 12/1988 | France . |
| 2132399 | 7/1984 | United Kingdom . |

OTHER PUBLICATIONS

Article from "Road Pricing—the Economic and Technological Possitilities" HMSO 1964.

*Primary Examiner*—Brent Swarthout
*Assistant Examiner*—Nina Tong
*Attorney, Agent, or Firm*—Kinney & Lange

[57] ABSTRACT

Charging apparatus for use in a road vehicle enables an authority to charge for road usage. As the vehicle is used on controlled parts of road way, debiting means debits credit units at a predetermined rate. A store keeps a record of the credit units used. The debiting rate can be preselected. An alphanumeric display can be visible through the windscreen of the vehicle to enforcement officers as the vehicle passes. The display can show the debiting rate currently in use. A pre-payment credit card system may be employed to charge the apparatus with credits. An internal display for the driver allows the driver to select the debiting rate demanded by signs along the controlled roadway.

17 Claims, 5 Drawing Sheets

ROAD USE CHARGING APPARATUS

BACKGROUND OF THE INVENTION

This invention relates to road use charging apparatus, that is apparatus to enable charges to be made for the use and general movement of vehicles on roads.

Increasing consideration is being given to the possibility of charging vehicle users for the use of vehicles on certain roads or at certain times. A number of proposals for such road charging systems have been made. These include systems requiring the provision of sensors and transducers along the road system whereby charges can be determined for road use by individual vehicles. Some systems involve the use of a meter within the vehicle which is controlled and activated by the transducers located along the road way. Other systems require a transponder mounted in the vehicle whereby a central control system can monitor vehicle movements and charge appropriately.

There are two problems related to the introduction of a road use charging system of the kinds mentioned above. Firstly, the expense of installing the necessary, infrastructure for a fully automated system in a large city for example would be very high. Secondly, there is perceived to be substantial public resistance to the imposition of a fully automated system which could have the effect of providing a record of individual vehicle movements throughout a city. Also, an automated system could give rise to substantial mistrust of the charging process.

Simpler systems have been proposed which could avoid the need for the substantial capital expenditure on infrastructure, but there remain problems of reliability and flexibility of such simple systems as well as satisfactorily control and enforcement.

SUMMARY OF THE INVENTION

According to one aspect of the present invention, there is provided road use charging apparatus for use in a vehicle comprising storage means to store a record of the number of credit units used, debiting means arranged when initiated to debit credit units in said storage means, selection means for selecting the rate relative to road usage at which credit units are to be debited in said storage means, and visual indicator means having a geometrically segmented display showing the debiting rate currently employed by the debiting means, the charging apparatus being adapted for location of the visual indicator means relative to the vehicle so that said display is visible from the roadside as the vehicle passes, the display being sufficiently prominent to be readable from the roadside at town driving speeds. Typically, the display is an alphanumeric display.

Thus, this aspect of the invention can provide a relatively simple and cheap apparatus for mounting in a vehicle which can be set and activated to record road usage as the debiting of credit units in the storage means of the apparatus. Importantly, the apparatus has a geometrically segmented or alphanumeric display arranged to be located and sufficiently prominent to be readily readable from the roadside as the vehicle goes past at normal town driving speeds. This display is arranged to show the debiting rate (or road use charging rate) to which the apparatus is currently set. This enables easy supervision and monitoring of the charging apparatus by roadside staff of a controlling authority, perhaps traffic police or traffic wardens. The cost of each charging apparatus could be kept quite low to minimise the cost of initial installation to vehicles, and the infrastructure cost to a controlling authority could also be minimal, requiring only adequate marking of the controlled roadways to notify vehicle drivers of the charging rate to be selected on their charging apparatus. The selected charging rates are preferably rates based on the time spent on a charged road way, rather than distance travelled.

Very preferably, the charging apparatus includes initiating means which is non-selectively operable by a driver of the vehicle to initiate said debiting means to debit at said debiting rate preselected by said selection means and simultaneously to show said rate on the display. With this arrangement, the act of selection of the appropriate charging rate can be separated from the act of initiating debiting at the selected rate. This is important in minimising driver distraction when operating the charging apparatus. Furthermore, it ensures the driver can have complete control over the apparatus which is considered to be a desirable attribute of the present system.

Normally, the apparatus includes an interior display means to indicate to the driver said debiting rate currently employed, said interior display means being adapted to indicate both the debiting rate (if any) currently employed and said preselected rate if different.

Conveniently also, said selection means is operable by the driver. Then said selection means may be arranged for selecting between a plurality of predetermined successively incremental rates and may include a pair of buttons for increasing and for decreasing respectively the preselected rate to the rate next above or below. Conveniently then the apparatus includes means to generate an audible tone on each depression of one of the pair of buttons. The tone for increasing the preselected rate may be audibly distinguishable from the tone for decreasing. In this way, the driver should be able to preselect the required charging rate without looking at the interior display.

Alternatively, or more preferably in addition, the apparatus may include a receiver for debiting rate signals transmitted from outside the vehicle by a controlling authority, said selection means being responsive to reception of said signals to preselect the debiting rate indicated by said signals. Then, said selection means may include means operable by the driver for switching said selection means to a mode in which it is responsive to said received signals. With this arrangement it can be seen that the driver still has full control. On the one hand, the driver will still be required to operate said initiating means to initiate debiting at a newly selected rate just received by the receiver. Further, on the other hand, the driver can in fact choose not to select said mode in which the selection means respond automatically to the received debit rate signals.

Still further, the apparatus may include means operable by the driver for switching said selection means to a mode in which it is responsive to said received signals and in which said initiating means automatically initiates said debiting means to debit at the debiting rate indicated by said signals. Thus, for a driver who has full confidence in automated operation of the charging apparatus, a further mode is available which eliminates any involvement on the part of the driver in changing charging rates.

In a preferred embodiment, said debiting means is arranged to continue operating at the previously selected rate, following initiation at a lower selected rate or deactivation, until a predetermined minimum period of time has passed since initiation at said previously selected rate. With this arrangement it can be seen that credit units will continue to be debited for the predetermined minimum period of time following first initiation of the debiting means, or following initiation at a higher selected charging rate. Turning off the debiting means, or changing to a lower charging rate will have no effect until the minimum period has passed. After the minimum period has expired, selection of a lower rate can be initiated immediately. Selecting a higher rate than the one currently employed can always be initiated immediately. By this arrangement, any temptation to operate the charging apparatus at a lower than required charging rate is greatly reduced. Further, the requirement for the controlling authority to provide roadside supervision is eased. For example, complete supervision will be provided by locating supervision points only at intervals about the controlled road system corresponding in distance roughly to the distance travelled by a vehicle during said predetermined minimum period of time.

Preferably also, said visual indicator means is arranged to assume a preliminary indicating mode for a predetermined period of time following initiation of the debiting means. For example, the visual indicator means may provide a flashing display for the first 10 to 30 seconds following initiation. In this way, it can readily be determined from the roadside that the driver of a vehicle has only recently initiated charging at the displayed rate. This should be a further disincentive to drivers to delay selecting the appropriate rate after entering a particular zone.

Conveniently, the apparatus includes interface means for interfacing with a removable credit enabling device carrying alterable machine readable indications of the number of new credit units available for debiting and control means arranged to enable said debiting means only if all the debit units available from the credit enabling device have not been debited in the storage means. With such an arrangement, the vehicle driver can use credit units provided for example on a credit card or smart card constituting the credit enabling device. This permits a prepayment charging system for example.

Thus, in another aspect of the present invention there is provided road use charging apparatus for use in a vehicle, comprising storage means to store a record of the number of credit units used, a debiting means for debiting the credit units in said storage means at a selected rate, visual indicator means having a display showing when said debiting means is operative with credit units being debited in said storage means, the charging apparatus being adapted for location of the visual indicator means relative to the vehicle so that said display is visible from the roadside as the vehicle passes, the display being sufficiently prominent to be readily observed from the roadside at town driving speeds, interface means for interfacing with a removable credit enabling device carrying alterable machine readable indications of the number of new credit units available for debiting and control means arranged to enable said debiting means only if all the credit units available from the credit enabling device have not been debited in the storage means.

In one arrangement, the control means may be arranged to alter said indications carried by a credit enabling device interfaced with the interface means to deduct at least one from said indicated number of available credit units and to record the deducted unit or units in said storage means. More typically, all the credit units indicated by the credit enabling device may be deducted and recorded in said storage means. The control means may then be further arranged to enable undebited credit units remaining in the storage means to be recorded on the credit enabling device before its removal from the interface means.

In another arrangement, said storage means is provided in a said credit enabling device and is connected to form part of said apparatus when the device is interfaced with said interface means. An example of such an arrangement would employ a smart card as the credit enabling device.

In a further development, the control means may be arranged to read an authorisation code carried by the credit enabling device and to enable said debiting means only if the authorisation code is correct. There may then be further provided a remote verification interface to enable checking of said authorisation code by communication with portable verification apparatus from outside the vehicle.

The apparatus may comprise a housing for the apparatus carrying said indicator means and a cradle to receive and support the housing and adapted to be secured behind the windscreen of a vehicle so that the display of the visual indicator means is visible through the windscreen when the housing is located in the cradle.

The above described apparatus may comprise an interior control panel with buttons or keypads or the like forming the selection means for selecting or preselecting the debiting rate and the initiating means for starting or stopping the debiting means. The physical shape and relationship of the buttons or keys may be designed to allow drivers to identify the keys by touch. Since in a preferred arrangement, a charging rate can be preselected, the driver is able to set a rate at any convenient time prior to entering the controlled zone.

The apparatus may provide for an operational procedure permitting the selection of double digit numbers for example. For example, the driver would select the first digit of the number, press a combination of two buttons or an optional special button to hold the first digit in memory and then select the second digit, thereby preselecting a charging rate identified by the double digit code. The interior display and on initiation the visual indicator would then display the two digits together or by alternating between the two digits.

The control panel may additionally provide a display for indicating to the driver the remaining number of credit units available for debiting.

BRIEF DESCRIPTION OF THE DRAWINGS

An example of the present invention will now be described with reference to the accompanying drawings in which.

DETAILED DESCRIPTION OF THE PREFERRED EMBODIMENTS

Figure 1:
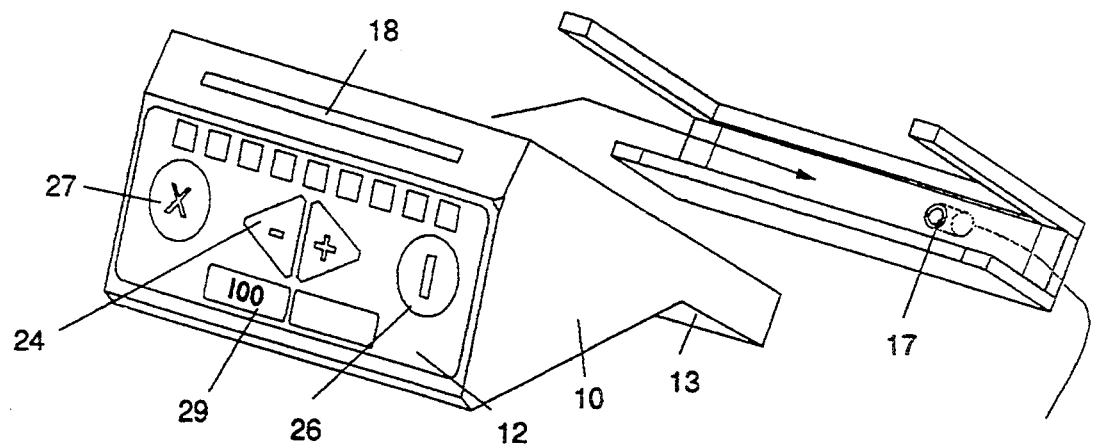
FIG. 1 is a perspective view of the housing and cradle of the apparatus, the view being taken from inside a vehicle in which the apparatus is mounted.
Figure 2:
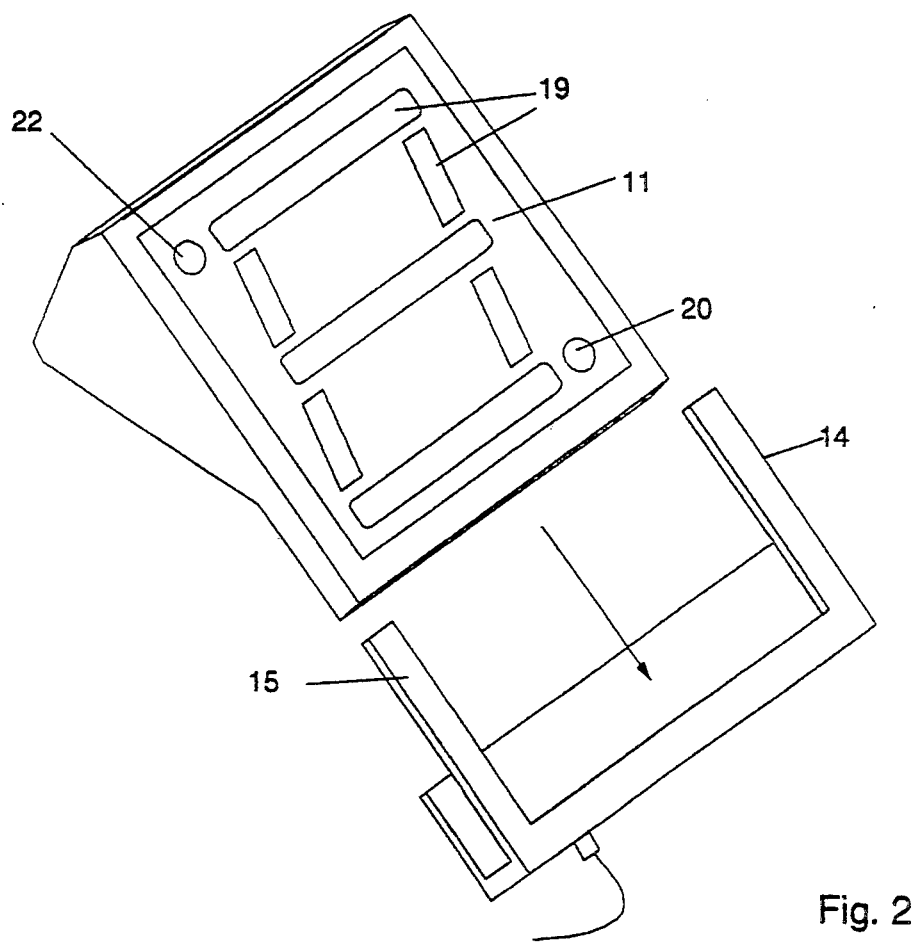
FIG. 2 is a perspective view of the housing and cradle, the view being taken from outside the vehicle in which the apparatus is mounted.

Referring particularly to FIGS. 1 and 2, the apparatus comprises a housing 10 shaped to present an external display panel 11 and an interior display panel 12. The lower part 13 of the casing is receivable within an upwardly open slot in a cradle 14, into which the housing is a push fit.

Figure 4:
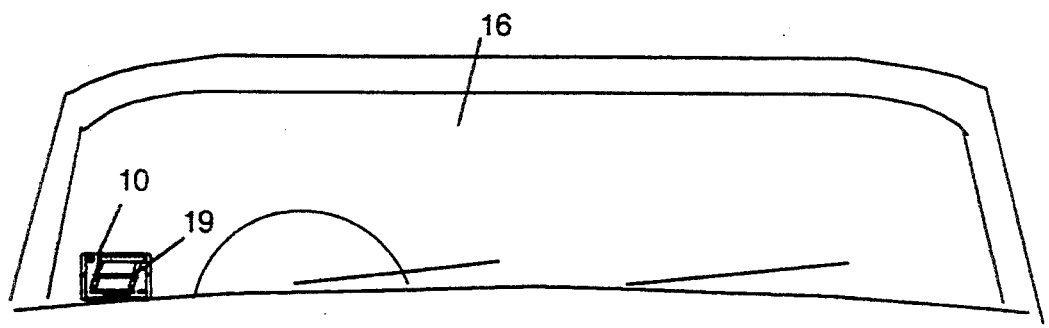
FIG. 4 shows the apparatus fitted in position on the interior surface of a vehicle windscreen.

The cradle 14 has adhesive strip surfaces 15 (FIG. 2) by which the cradle 14 can be attached to the interior surface of a vehicle glass windscreen 16, as illustrated in FIG. 4. In this position, the exterior display panel 11 can be readily seen by an observer outside the vehicle, whilst the interior display panel 12 can be readily viewed by the vehicle driver.

The apparatus may be powered by a battery housed within the housing 10 or from the vehicle battery by means of a connector 17 located in the base of the cradle 14 and linked by wiring to the vehicle battery or to the vehicle cigar lighter socket. The top of the casing of the unit 10 has an elongated slot 18 to receive a card of the form shown in FIG. 8 or 9.

The experior display panel 11 has a plurality of areas which form an alphanumeric display 19 and which are selectively illuminated to display a numeral between nought and nine or letters or other symbols. The exterior display panel 11 also has a verification interface 20 for checking the authenticity of the unit 10. The interface 20 may include a hologram image for visual inspection and verification, or it may alternatively comprise a light sensitive cell or electromagnetically sensitive device, linked to an electronic circuit within the housing, which is activated only by specifically coded patterns of light or electromagnetic emission from suitable checking equipment and which will cause an indication to be emitted by the apparatus confirming its authenticity. The interface 20 may be arranged to emit an authorisation code read from the card inserted in the slot 18.

Figure 3:
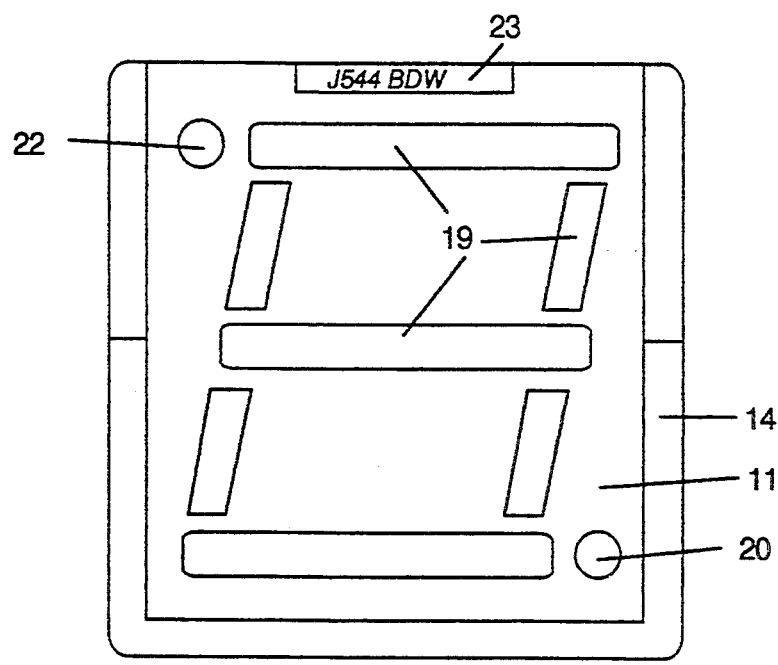
FIG. 3 is an exterior view of a display panel for an alphanumeric display of the apparatus.

The exterior display panel 11 additionally includes an option element or elements 22 which can be used for desired additional indications such as to indicate additional levels of debiting rates. A personalisation strip 23 (FIG. 3), such as is included on charge cards, may be provided on the display panel 11 to permit owners to mark the unit with an indelible identifying mark, such as their vehicle registration number, to deter theft.

The internal control-panel 12 has selection means in the form of a pair of rate selector buttons 24 which are pressed to preselect a debiting rate, and rate selection indicators 25 (in the form of a row of lights) indicate the debiting rate preselected. An "activate" button 26 and a "cancel" or "off" button 27 start or stop the debiting circuit, respectively. A rate and message indicator 28 displays the current debiting rate and is available to display other messages to the user. A panel 29 indicates the remaining credit. Touch key pads may be used instead of buttons on the panel 12.

Figure 6:
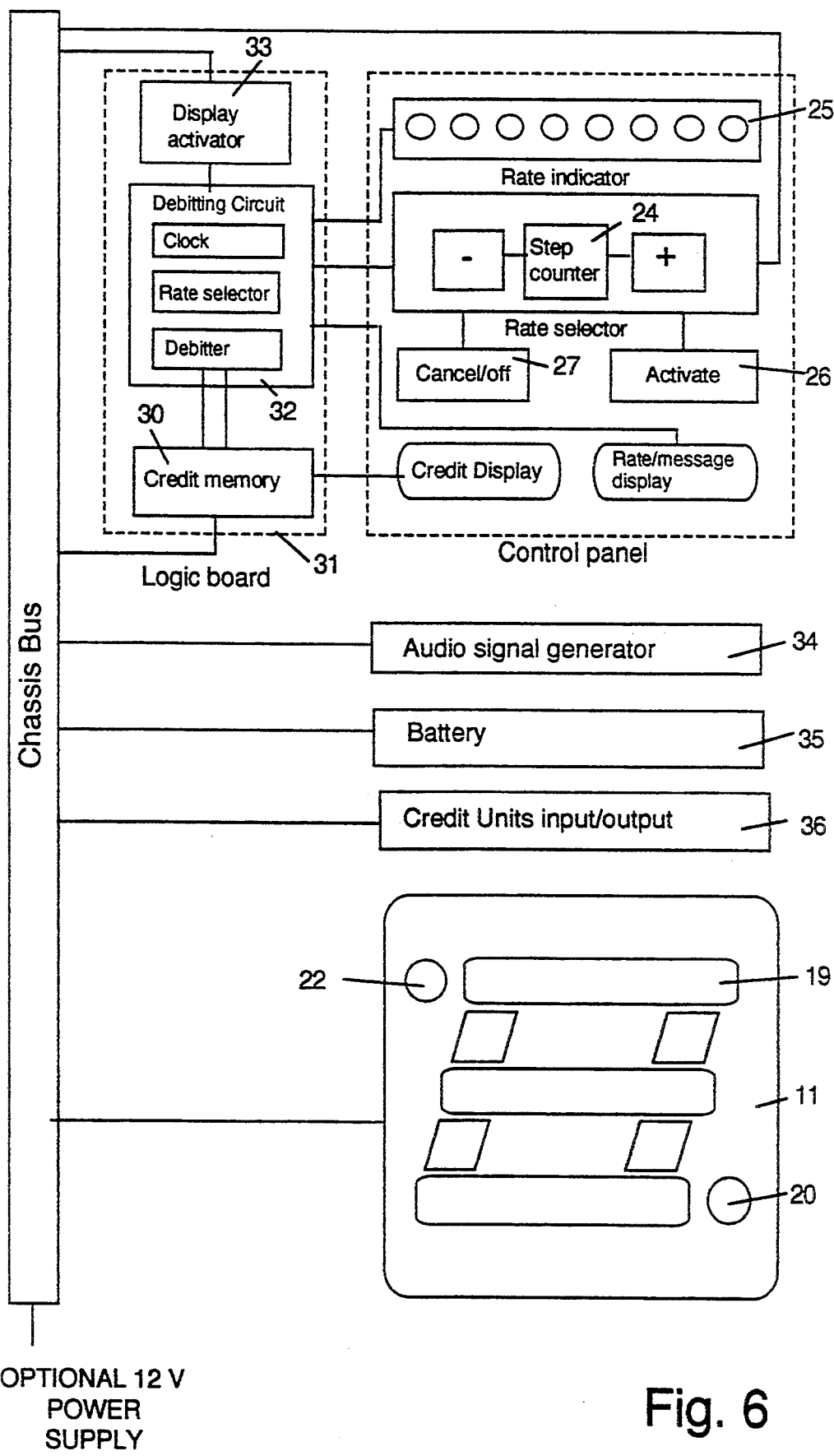
FIG. 6 is a functional block diagram of the apparatus.

FIG. 6 is a block diagram of the functions of the apparatus. A logic board 31 includes storage means in the form of a credit memory 30, a debiting circuit 32 and a display activator 33 which controls the external display panel 11. An audio signal generator 34 provides an audible beep on each operation, thus enabling the user to select a charging rate without looking at the unit 10. The optional battery is indicated diagrammatically at 35 in FIG. 6, and the interface with the card, by which credit units in the memory 30 are incremented, is shown at 36.

Figure 5:
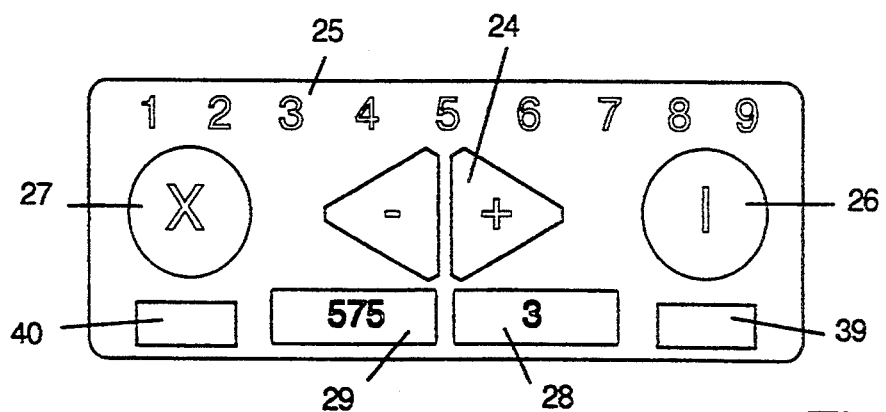
FIG. 5 shows an internal control panel of the apparatus.
Figure 7:
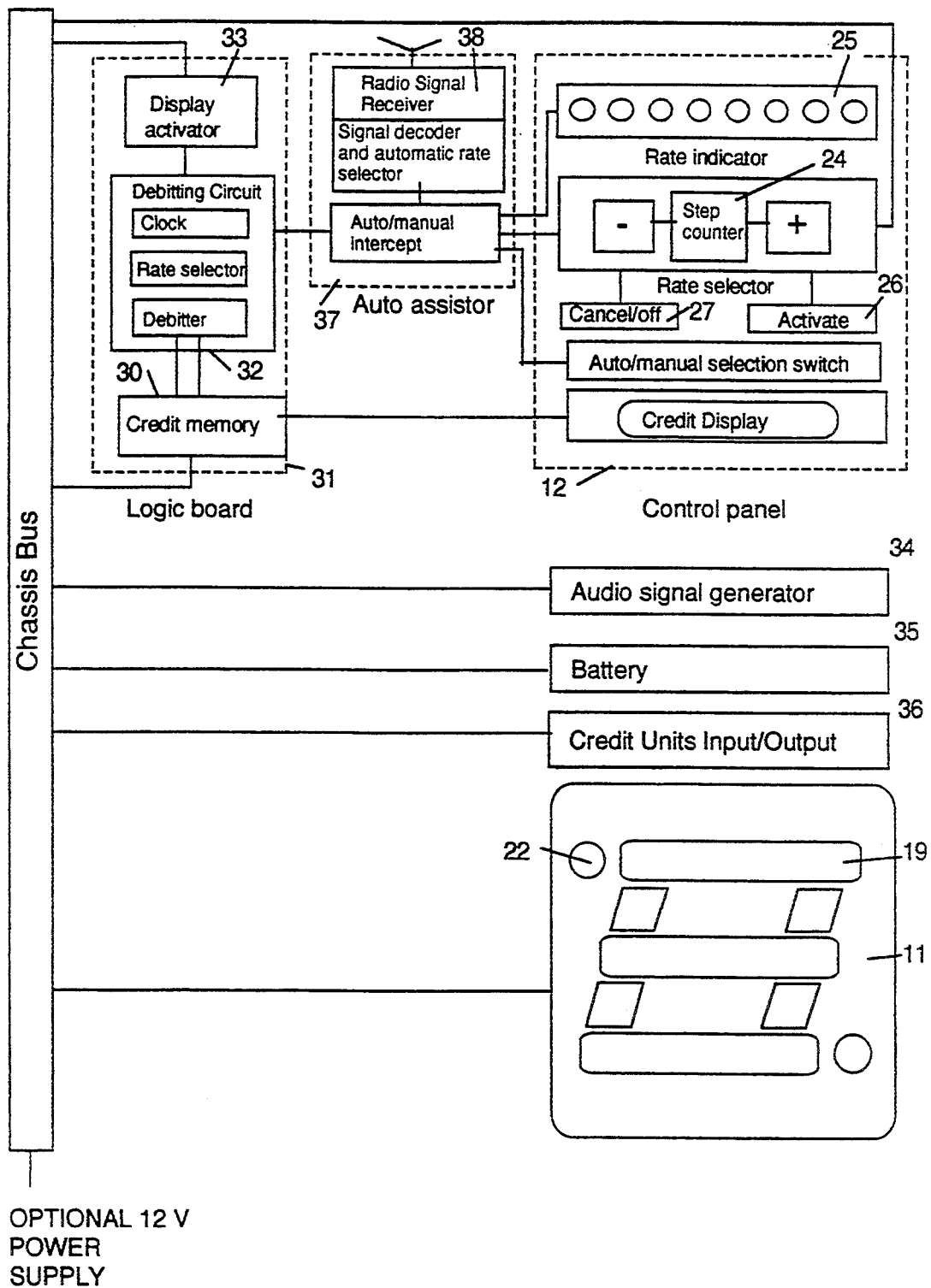
FIG. 7 is a functional block diagram of a modified form of the apparatus, using radio transmission to select the debiting rate.

In the basic form of the device illustrated in FIGS. 1 to 6, the user preselects the debiting rate by means of the rate selector buttons 24. In the modification illustrated in FIG. 7, the selection of a debiting rate may be optionally assisted by an auto-assist facility, diagrammatically indicated at 37, comprising a radio receiver 38 capable of receiving electromagnetic signals which automatically preselect a current debiting rate. When this auto-assist facility is provided, the device preferably has an auto/manual selection switch 39 on the internal display panel 12 (Fig.5). The switch 39 allows the activation and de-activation of the selection means to be initiated by the reception of signals from fixed transmission points.

Signals broadcast by the local authority from fixed transmission points with the appropriate debiting rate for a particular locality and time are received by the unit 10, and cause the appropriate rate to be preselected without manual selection. Such signals may for example be broadcast on a wide coverage basis, or locally on a cellular principle, or very locally on a lane by lane basis. Means are provided for the user to select manual override or auto-assisted modes as desired. Activation and de-activation of the debiting circuit, i.e. initiation at a newly selected rate, can remain manually controlled at all times.

It will be appreciated that the auto-assist means require only means for the receipt of generated signals, not for transmission or signals from the vehicle. This reduces the power demand on on-board equipment, reduces risks of malfunction, and preserves anonymity for the user.

It will be readily appreciated that the auto-assisted version of the apparatus can be satisfactorily operated manually in areas where appropriate signal emitting infrastructure has not been provided, for example, in smaller towns, or in areas where there are difficulties in providing such infrastructure, or where the costs of providing such infrastructure are not thought worthwhile. In such localities users with auto-assisted versions of the device will be expected to select manual override.

It will also be readily appreciated that standard manual versions of the device can be used in areas where appropriate signal emitting infrastructure has been provided, and that users will have obtained a familiarity with the manual system prior to introduction of an auto-assisted system. The system may therefore be introduced initially in a locality as a low-cost manual system without signal emitting infrastructure, in order to test efficiency or public acceptability, without prior commitment to further expenditure. When the low-cost system has been successfully established a local authority may then decide at any future time to introduce signal emitting infrastructure for operation or cost-benefit reasons, and users will be able to obtain the auto-assisted version of the apparatus. The manual apparatus will however still be usable and may be phased out gradually, thereby reducing initial expenditure. Users will of course be familiar with the manual version and this will enhance public acceptability of the auto-assisted apparatus.

In a further alternative operational mode of the auto-assisted apparatus, a special procedure such as the holding down of the auto-manual switch for an extended period, typically one second, may provide for fully automatic activation by the apparatus of the debiting circuit, at appropriate debiting rates as automatically preselected, without manual intervention. The user may release the device from fully automatic operation at any time by appropriate operation of the auto/manual switch.

In a further alternative version of the apparatus a parking mode is provided, whereby suitable selection means such as a switch 40 (FIG. 5) is provided which if operated in conjunction with the rate selector buttons 24 allows debiting to take place at rates other than those used for moving vehicles. Debiting at such rates will cause an appropriate prominent indication on the exterior display panel 11, for example by activation of a particular indicating element, such as the option element 22 (FIG. 4), or by causing the display to alternate between two configurations, the first configuration indicating the particular parking debiting rate and the second indicating that the parking mode is in effect.

Figure 8:
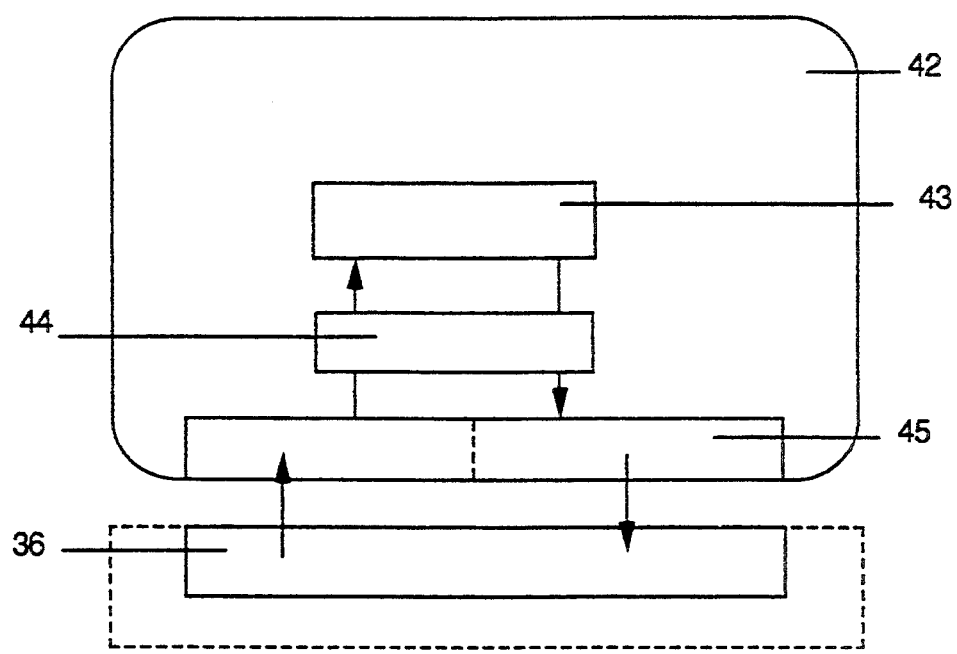
FIG. 8 shows schematically a pre-payment card for use with the apparatus.

A pre-payment card 42 of the form shown in FIG. 8 is used to input credit units into the storage means of the logic board. For this purpose, the card 42 is inserted into the slot 18 and a physical or electronic code on the card causes the memory circuit to be incremented with credit units. The debiting circuit 32 can be activated only so long as credit units remain in the credit memory 30. As indicated in FIG. 8, the pre-payment card has a register 43 containing the number of pre-paid units, an authentication and voiding unit 44 and a section 45 which interfaces with the section 36 of the unit 10, although other means of transmitting credit units can be employed according to the state of the art.

Figure 9:
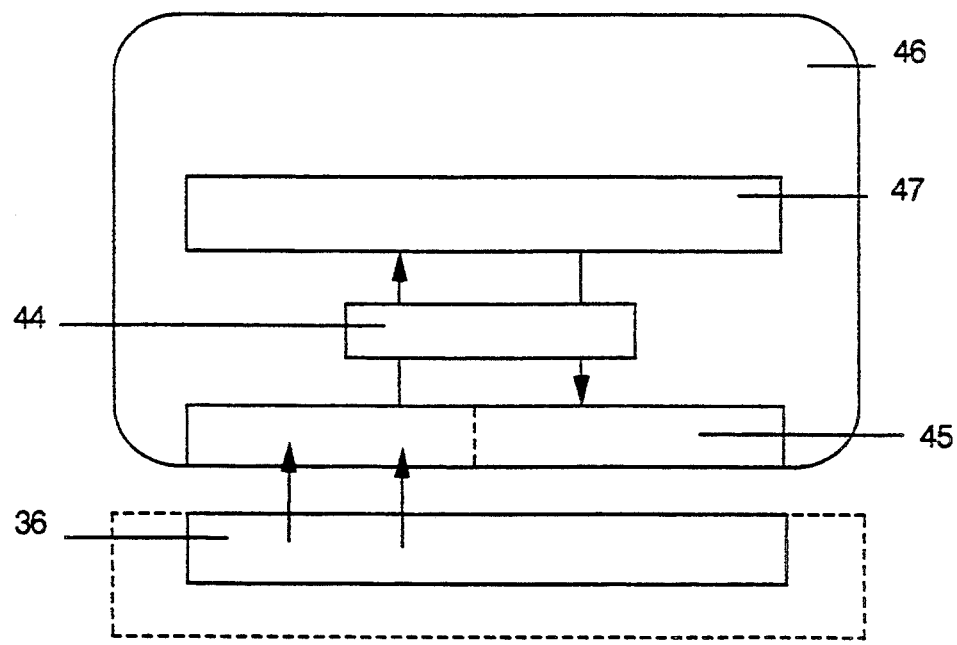
FIG. 9 shows schematically a "smart" card for use with the apparatus.

The apparatus can also be configured to accept a credit card of the type known as a "smart" card, as illustrated at 46 in FIG. 9. The card 46 is retained in the slot 18 when the unit 10 is in use. The card 46 has a read/write memory or store 47 and units are debited from the store when the unit 10 is in use. The card 46 again has an authentication and voiding unit 44 and an interface section 45 which co-operates with the section 36 of the unit 10. This type of credit card is distinct from the pre-paid type of card shown in FIG. 8. In either case, the unit 10 will recognise the type of card introduced, and as appropriate either transfer credit units in one step from a pre-paid type of card to the internal memory 30, or will deduct units according to actual use from the memory or store 47 incorporated in the smart card 46.

When the cradle 14 is correctly fitted to the vehicle windscreen 16, and the unit 10 is correctly inserted in the cradle 14, the exterior display panel 11 can easily be observed from the roadside or other suitable observation point. The alphanumeric display 19 is of sufficient size and brightness to allow an observer standing at the roadside to easily determine the numeral displayed on the exterior display panel 11, regardless of the reasonable speed of the vehicle or the ambient lighting conditions. The design of the display elements also facilitates identification of the debiting rate through recognition of the display panel configuration by an electronic optical recognition device such as a roadside video camera attached to suitable equipment, thereby enabling installation of equipment which can automatically detect and record photographically any vehicles not displaying the appropriate charging rate. By use of the rate selector buttons 24, the vehicle driver can select an appropriate debiting rate which is indicated by the display of a corresponding number between nought and nine, both on the external display panel 11 and on the rate indicator lights 24 and the current rate display 28.

The debiting rate may be stipulated for example according to particular time periods, or to particular areas, to direction of flow, or a combination of the preceding.

It is envisaged that public authorities may control or charge for the use of roads or bridges by introducing legislation requiring vehicles to carry a road meter such as the apparatus described herein, the housing 10 to be affixed in the vehicle in a stipulated position, and that on entering the road or area the apparatus must be activated at the correct debiting rate.

Thus solely by way of illustrative example a city authority may require that all vehicles using roads within certain parts of the city at certain periods shall carry an approved apparatus to display proof of debiting at the correct debiting rate.

The debiting rate may however be varied at any time according to circumstances by the local authority or road owner simply by the display of notices advising users of vehicles of changes in the requirements.

A vehicle which did not display proof of debiting could be immediately stopped by a police officer or traffic officer, or its registration number noted for prosecution.

A time delay in the apparatus is incorporated to ensure that the lights on the exterior display panel 11 are flashed on and off, for an initial short predetermined period of time (typically between 10 and 30 seconds) after switching on and activation of a particular debiting rate, thereby avoiding the possibility of users attempting to avoid activation of the apparatus until seeing an officer. The display reverts to normal display mode after the predetermined period of time.

A further time delay is incorporated in the unit 10 to cause the debiting circuit to run for a minimum predefined period of time after activation at a particular rate. This will produce a minimum charging block for fiscal purposes, but will also assist enforcement since spot-checks need only to be positioned at intervals corresponding to the typical distance covered by a vehicle during the minimum charging period, thus an area can be effectively monitored with relatively few personnel or cameras.

Appropriate legislation would permit the local authority to enforce the requirements described herein.

Tickets or cards would be sold by local authorities and charged for according to the number of credit units embodied within each ticket or card. The sale of such tickets or cards could be controlled centrally, or via intermediary agents such as petrol stations, shops, post offices etcetera. The unit 10 itself could also be sold or temporarily rented out via such agents. Special versions of the apparatus could be produced for special categories of vehicle such as coaches, goods vehicles, etc. operating at special debiting rates.

In an alternative form of the apparatus, the meter would not rely on pre-payment, but would simply register the total number of units consumed, for reading at regular intervals.

The reading could be done in several ways, for example:

(1) the meter could be read manually in situ, like an electricity meter,
(2) a ticket or smart card could be inserted which reads the current meter reading, and the card is then sent to a billing office where the reading is taken and the bill issued,
(3) the meter could be read electronically in situ by connection to a suitable electronic device designed for the purpose. (The device would have a probe for insertion into the meter, either in the shape of a card for insertion into the card slot, or a separate connection for which a socket would be provided in the meter). The data extracted could be transcribed into conventional paper records or in the case of larger companies be transmitted by modem or other electronic form to the central billing office if required.

Although only nine rates of normal debiting are possible on the unit 10 as illustrated, since more rates would unduly distract a driver in the manual form of the apparatus, additional tiers such as the addition of a notional value of ten to all rates may be allowed for use of the option element 22. Thus, an additional switch or operational procedure in the rate selectors button 24 or activate button 26 may be incorporated to enable the user to select an additional tier. Such selection would be in response to road signs in the manual version or would be selected automatically in the auto-assisted version. The option element 22 would signify that debiting is taking place at the appropriate rate.

What is claimed is:

1. A road use charging apparatus for use in a vehicle comprising:
   a store for storing credit units;
   a debiter for debiting credit units in said store at a selected rate;
   an initiation control operable by a driver to initiate said debiter to debit at said selected rate;
   a visual indicator having a display showing when said debiter is operative with said credit units being debited in said store, wherein said display is positioned in the vehicle so that said display is visible from a roadside as the vehicle passes, the display being readily observable from the roadside at town driving speeds;
   an interface for interfacing with a removable credit enabling device, said credit enabling device providing a number of new credit units available for debiting; and
   a controller arranged to enable said debiter only if all the credit units available from the credit enabling device have not been debited in said store.

2. The apparatus as claimed in claim 1, wherein the controller is arranged to alter said number of new credit units carried by said credit enabling device and other credit enabling devices interfaced with said interface to deduct at least one credit unit from said number of new said credit units available and to record said credit unit or units deducted from said credit enabling device in said store.

3. The apparatus as claimed in claim 2, wherein the controller is arranged to enable undebited credit units remaining in the store to be recorded on the credit enabling device before its removal from the interface.

4. The apparatus as claimed in claim 1, wherein said store is provided in said credit enabling device and is connected to form part of said charging apparatus when said credit enabling device is interfaced with said interface.

5. The apparatus as claimed in claim 1, wherein the controller is arranged to read an authorization code carried by the credit enabling device and to enable said debiter only if the authorization code is correct.

6. The apparatus as claimed in claim 5, further comprising a remote verification interface to enable checking of said authorization code by communication with a portable verification apparatus from outside the vehicle.

7. The apparatus as claimed in claim 1, wherein said visual indicator is arranged to have a preliminary indicating mode for a predetermined period of time following initiation of the debiter.

8. The apparatus as claimed in claim 1, further comprising a housing for the apparatus carrying said visual indicator and a cradle to receive and support the housing and adapted to be secured behind the windscreen of said vehicle so that the display of the visual indicator is visible through the windscreen when the housing is located in the cradle.

9. The apparatus as claimed in claim 1, wherein the display of said visual indicator is geometrically segmented.

10. The apparatus as claimed in claim 1, further comprising a selection control for preselecting a rate relative to road usage at which said credit units are to be debited on operation of said initiation control by the driver.

11. The apparatus as claimed in claim 10, wherein said selection control is manually operable.

12. The apparatus as claimed in claim 11, wherein said selection control is arranged for selecting between a plurality of predetermined successively incremental rates and includes a pair of buttons for increasing and for decreasing respectively the preselected rate to the rate next above or below.

13. The apparatus as claimed in claim 10, further comprising an interior display to indicate to the driver said selected debiting rate currently employed, said interior display being adapted to indicate both said selected debiting rate (if any) currently employed and said preselected rate if different.

14. The apparatus as claimed in claim 10, further comprising a receiver for debiting rate signals transmitted from outside the vehicle by a controlling authority, said selection control being responsive to reception of said signals to preselect a debiting rate indicated by said debiting rate signals.

15. The apparatus as claimed in claim 14, wherein said selection control includes a switch operable by the drive for switching said selection control to a mode in which it is responsive to the reception of said debiting rate signals to preselect the debiting rate indicated by said debiting rate signals.

16. The apparatus as claimed in claim 14, further comprising a switch operable by the driver for switching said selection control to a mode in which it is responsive to said received debiting rate signals and in which said initiation control automatically initiates said debiter to debit at the debiting rate indicated by said debiting rate signals.

17. The apparatus as claimed in claim 10, wherein said debiter is arranged to continue operating at a previously selected rate, following initiation at a lower selected rate or deactivation, until a predetermined minimum period of time has passed since initiation at said previously selected rate.

* * * * *